Dec. 12, 1950 S. B. MAURER ET AL 2,533,487
GAS HAMMER
Filed Aug. 15, 1946 8 Sheets-Sheet 5

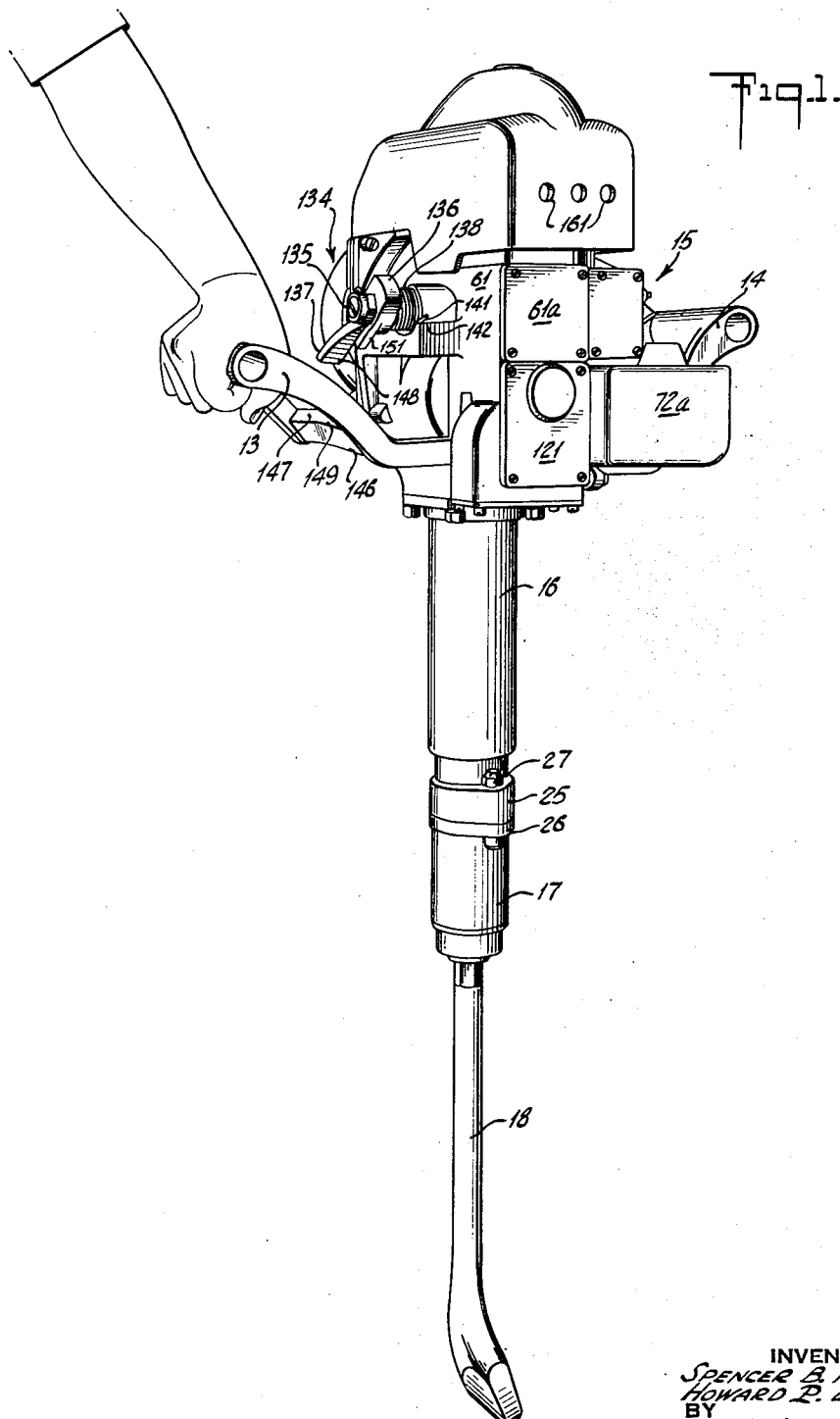

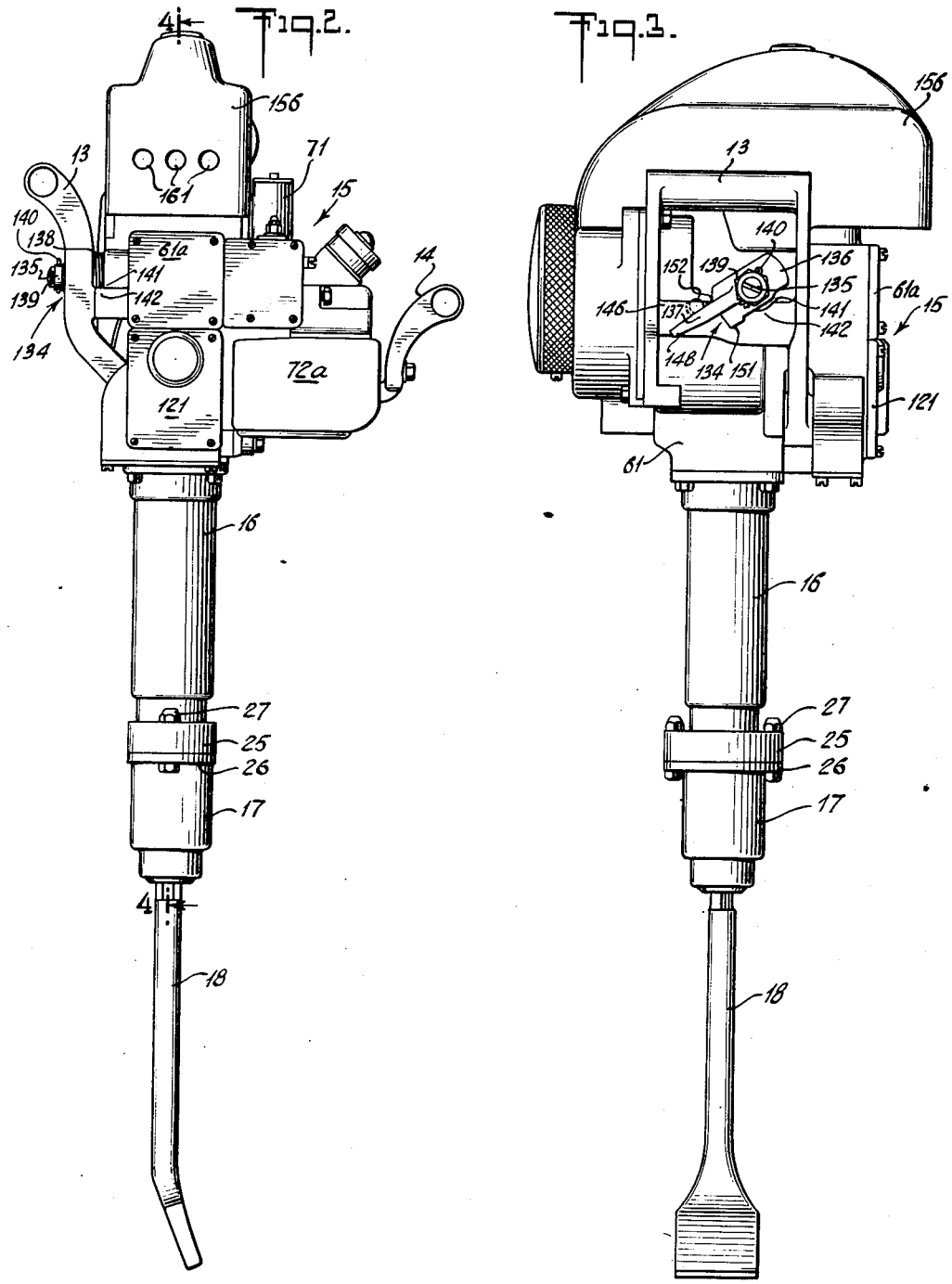

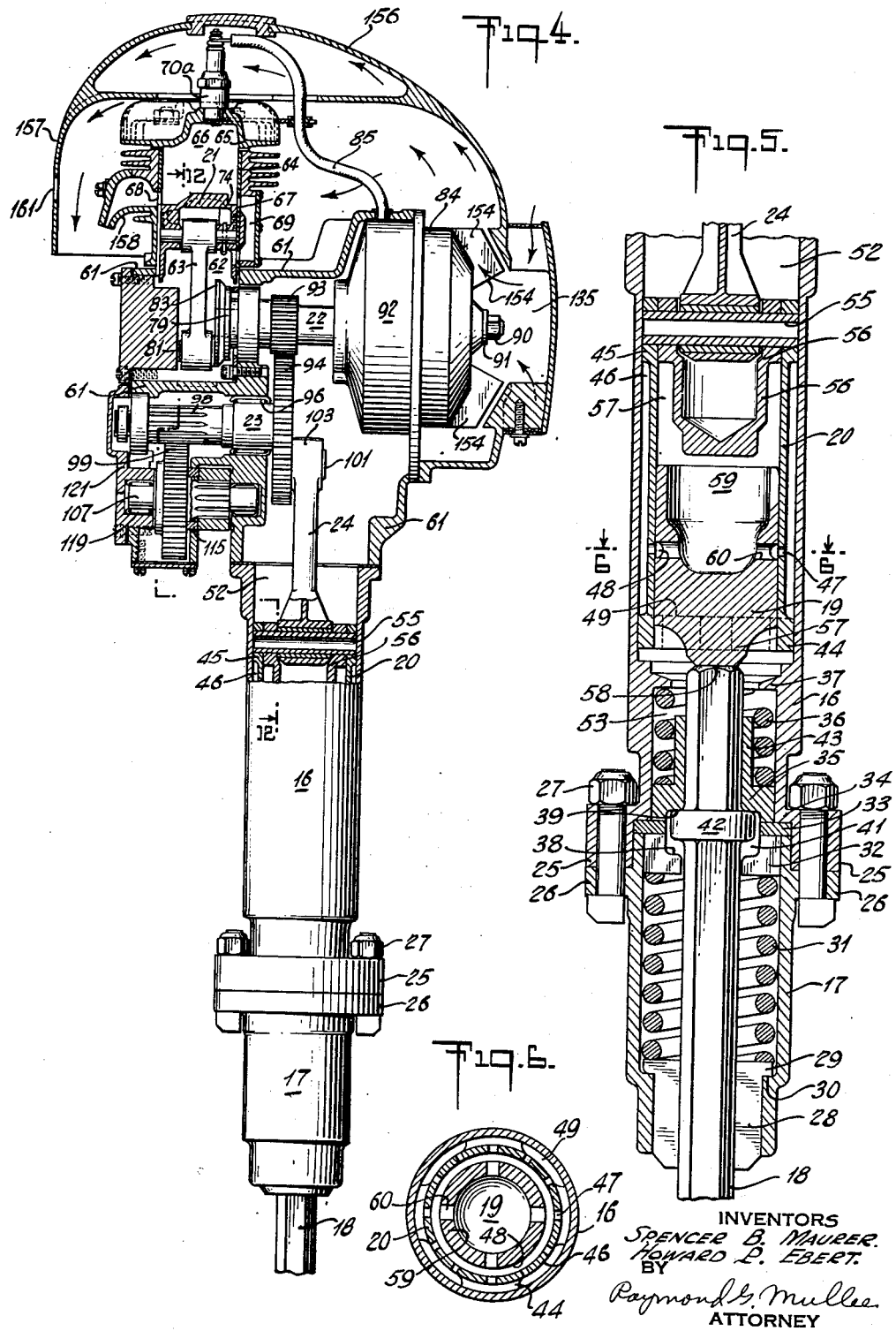

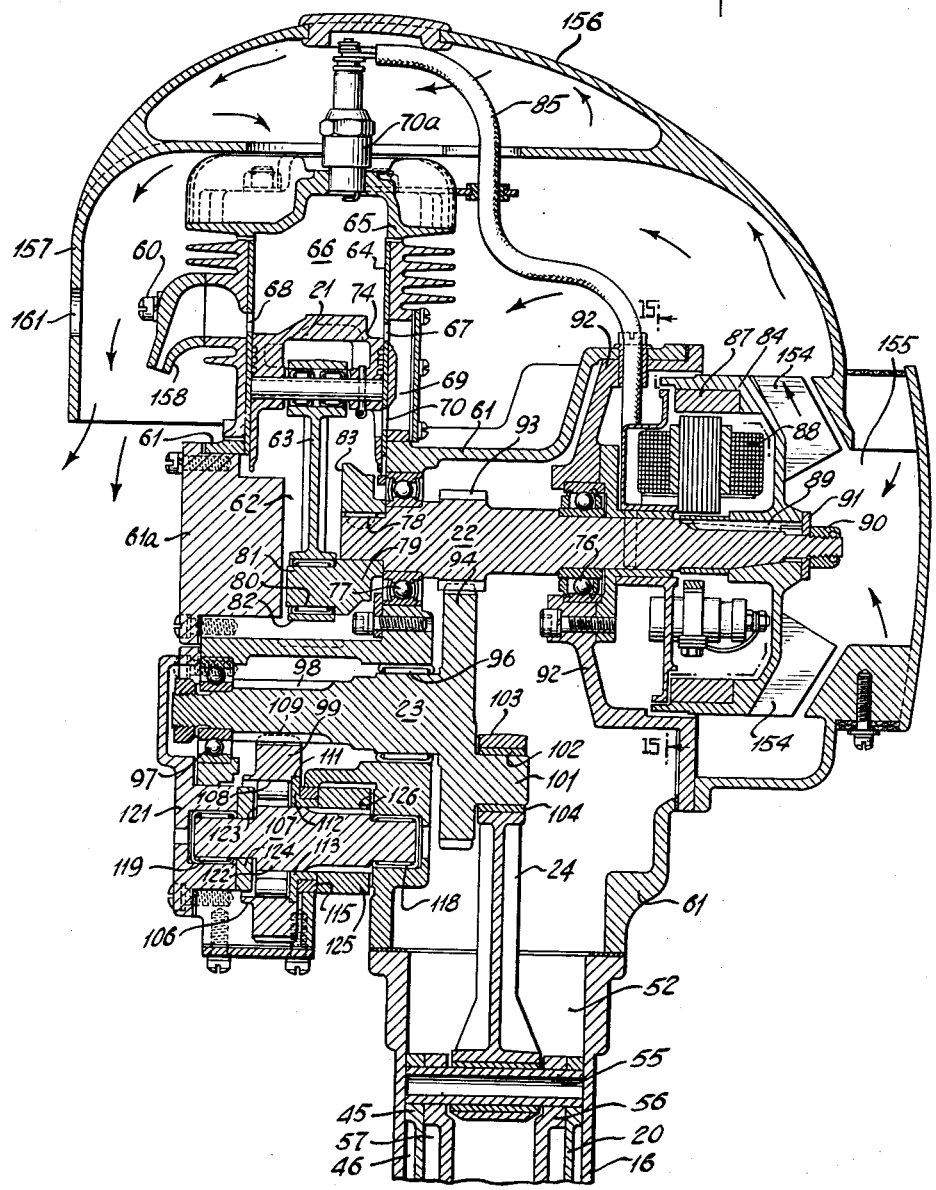

INVENTORS.
SPENCER B. MAURER.
HOWARD P. EBERT.
BY Raymond G. Mullee
ATTORNEY

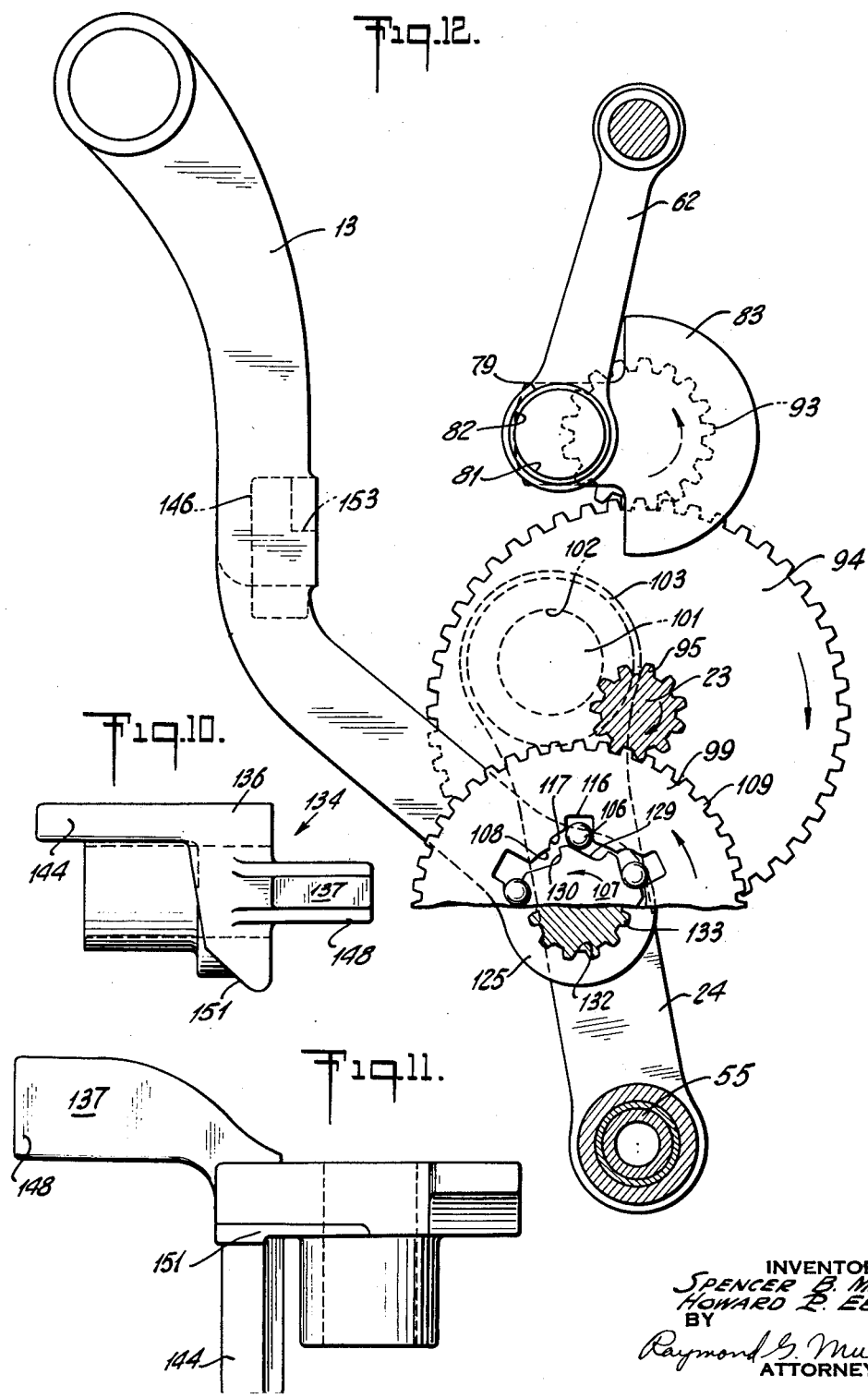

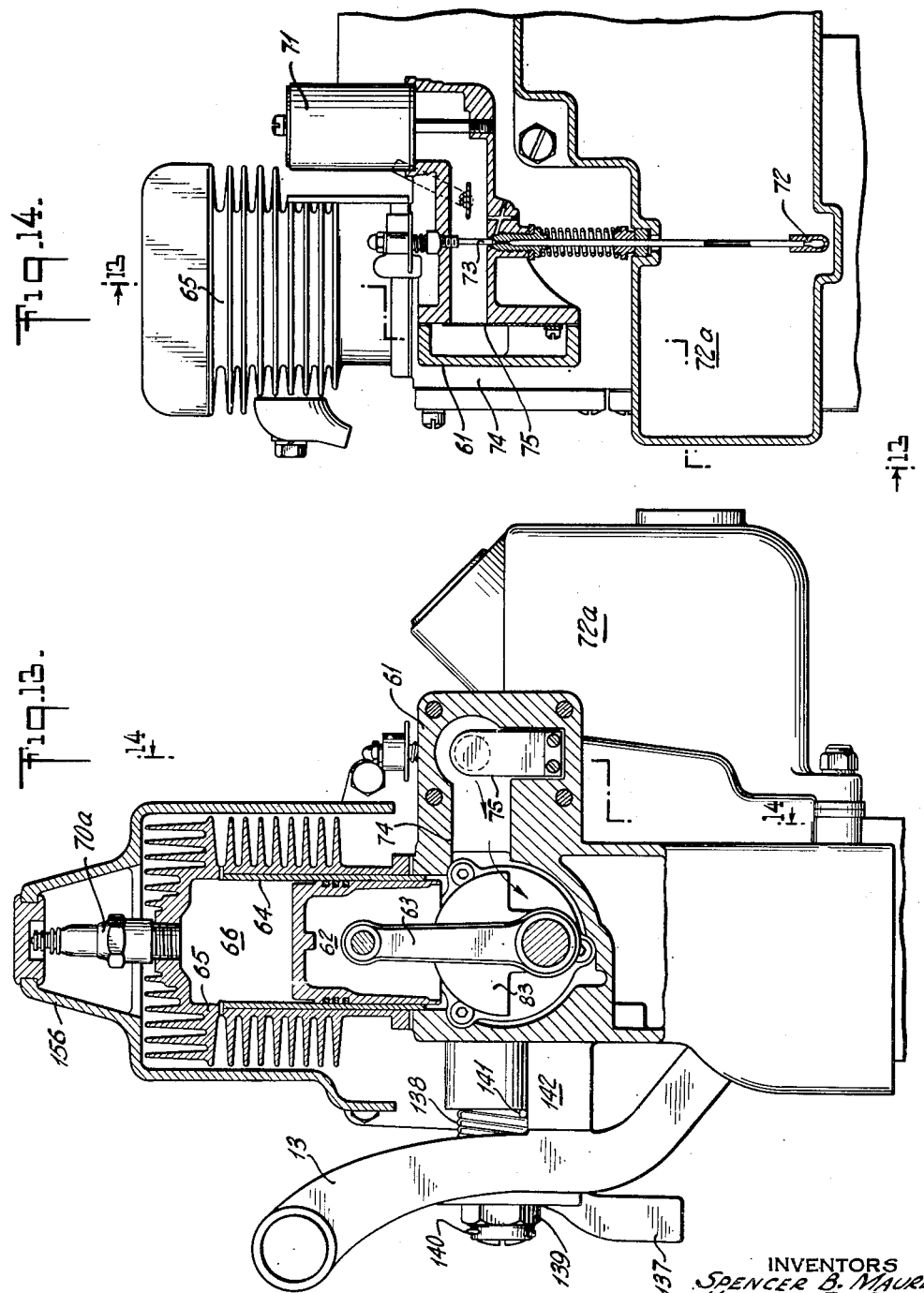

Dec. 12, 1950  S. B. MAURER ET AL  2,533,487
GAS HAMMER

Filed Aug. 15, 1946  8 Sheets-Sheet 8

INVENTORS
SPENCER B. MAURER.
HOWARD R. EBERT.
BY
Raymond G. Mullee
ATTORNEY

Patented Dec. 12, 1950

2,533,487

UNITED STATES PATENT OFFICE 2,533,487

GAS HAMMER

Spencer B. Maurer and Howard P. Ebert, Cleveland, Ohio, assignors to Chicago Pneumatic Tool Company, New York, N. Y., a corporation of New Jersey Application August 15, 1946, Serial No. 690,654

5 Claims. (Cl. 123—7)

This invention relates generally to percussive tools in which the motive power is derived from an integrally formed internal combustion engine, and more particularly to improvements to a tool of this type in which the driving piston is returned through its compression stroke by the momentum of a fly-wheel and crankshaft operatively connected to the driving piston. A tool of the class to which this invention relates is illustrated by a gas hammer for which a patent, No. 2,333,419, was issued to Clifford E. Fitch on November 2, 1943.

In the illustrative embodiment of the present invention, a tie tamper is driven by a gasoline powered single cylinder, two cycle, air-cooled engine designed to impart rapid downward blows to the tamping bar which is mounted vertically in the lower end of the tool. The engine is mounted directly atop a cast aluminum housing which is the main body of the tool and to which are secured a gasoline supply tank, a carburetor, air cooling apparatus, hammer piston barrel, and manipulative handles. The location of these handles in line with and just above the center of gravity of the tool assembly insures a proper balance for easy handling of the device. The tool is operated by one man who grasps the two handles near the top where most of the weight is concentrated and directs the tool by placing the spade of the tamping bar in position and allowing the tool to drive the stone ballast under the ties as desired. The operator then lifts the tool to another spot to repeat the operation, the tool continuing to operate during the transfer movement. Thus the tool operates continuously without any loss of time.

An object of the invention is to provide a novel arrangement of the tamping bar in relation to the driving elements which will be highly effective in operation.

A further object is to improve the structural arrangement of the striking piston, the piston cage, and the piston barrel so that these members will operate more efficiently in combination with each other and as a means of transmitting power from the main crankshaft to the tamping bar.

A still further object is the provision of an improved cooling system which is highly effective not only to cool the engine but also to maintain the housing of the tool at a temperature that is comfortable for the operator.

Another object of the invention is an arrangement of the engine exhaust within the hood of the tool to increase the circulation of the air used to cool the engine.

Still another object is the introduction of a novel starting mechanism which will enable the operator to start the operation of the tool by a simple manual thrust.

Another object of the invention is to provide an arrangement of operating handles for the tool which are so disposed in relation to the center of gravity of the tool that the entire device is easily moved from place to place while the mechanism is still in operation.

Another object is the use of a novel latch arranged so that the handle by which the machine is started may be easily released or slammed into a locked position by the operator while the mechanism is in vibratory operation.

Another object of the invention is to provide a member which will have the two-fold function of a handle useful in directing the tool when in operation and of a starter for the engine.

Other objects and structural details of the invention will be apparent from the description when read in conjunction with the accompanying drawings, wherein:

Fig. 1 is a view, in perspective, of the tool of the present invention, shown adapted for the tamping operations, with the starter handle in the lowered position;

Figs. 2 and 3 are respectively front and side views of the tool in elevation, with the starter handle in the raised or normal position;

Fig. 4 is a longitudinal section taken along the line 4—4 of Fig. 2, the lower part of the tool being shown in elevation;

Fig. 5 is a longitudinal section in the same plane as Fig. 4, showing the striking hammer and cage in lowered or foremost position in contact with the working implement;

Fig. 6 is a cross-section as indicated by the arrows 6—6 in Fig. 5;

Fig. 7 is a sectional view of the upper portion of the tool, similar to Fig. 4 but on a larger scale, and showing the engine and transmission and starting mechanism;

Fig. 10 is a detail view of the latch, in elevation, as viewed from the left of Fig. 8;

Fig. 11 is another elevational view of the latch as seen from the bottom of Fig. 8;

Fig. 12 is a longitudinal sectional view of the transmission mechanism shown in relation to the starter handle and shaft with the intervening clutch in position for starting operation;

Fig. 13 is a view showing the starter handle in latched position and the fuel supply tank, both in elevation, and the engine with the piston and crank handle in section;

Fig. 14 is a view in longitudinal section of the carburetor and a part of the tool housing and the engine head in elevation;

Figure 8:
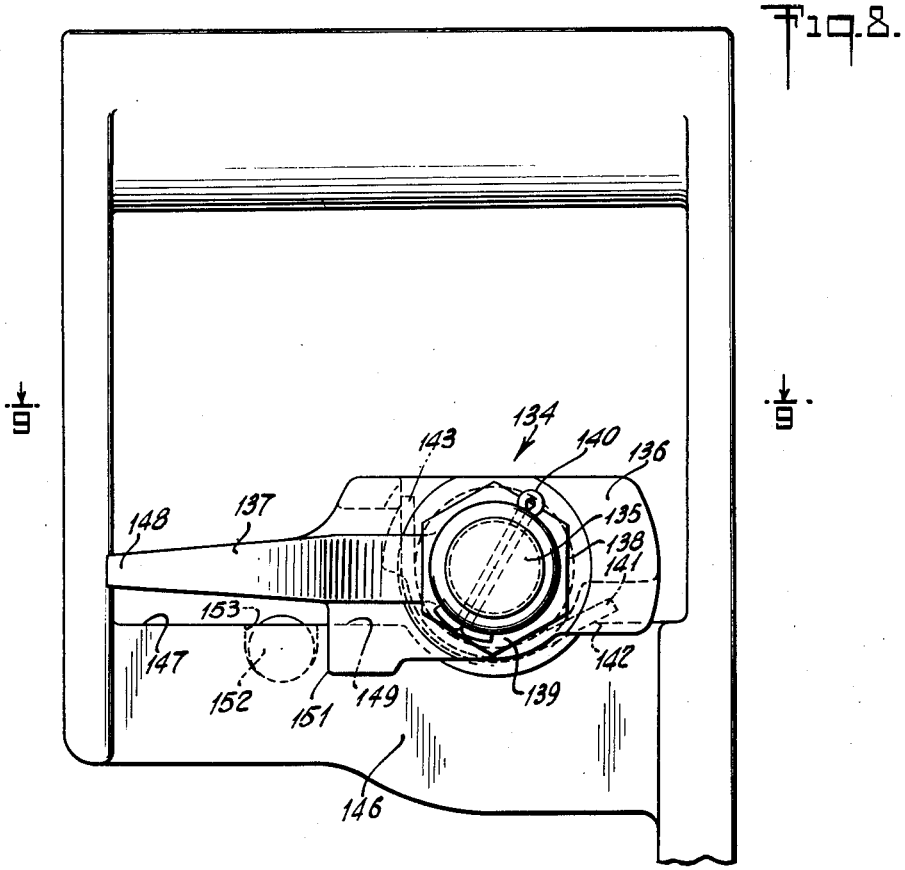
Fig. 8 is a side elevation of the upper portion of the starter handle, showing the latch in horizontal position.
Figure 9:
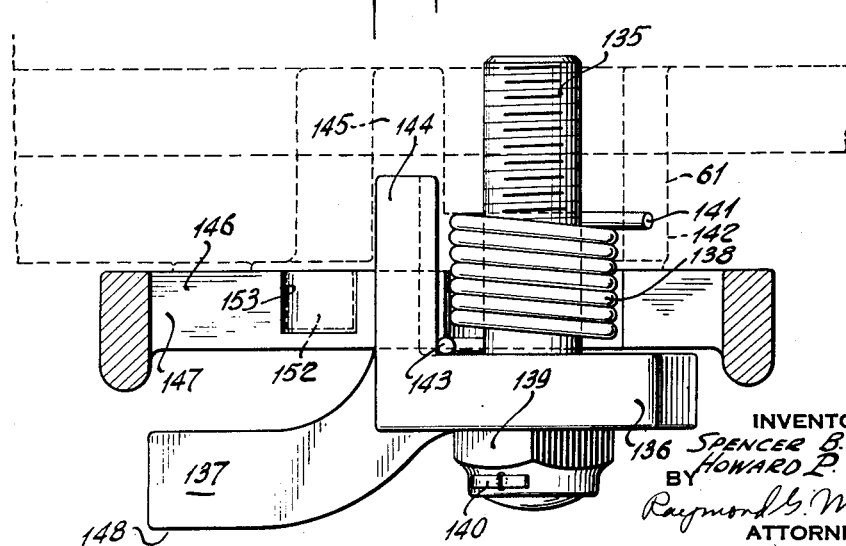
Fig. 9 is a view looking downward, showing the latching device in plan, and the starter handle in section, as indicated by the arrows 9 in Fig. 8.

Fig. 4 is drawn to a larger scale than Figs. 1, 2 and 3. Figs. 5, 6, 7, 13 and 14 are on a larger scale than Fig. 4; while Fig. 12 is further enlarged. Figs. 8, 9, 10, 11 and 15 are the most enlarged, being drawn to twice the scale of Figs. 5, 6, 7, 13 and 14.

As shown in Fig. 1, the tool of the invention is a portable, unitary structure which may be manipulated by one or two men by means of properly and conveniently disposed handles 13 and 14. For purposes of description, the tool may be considered as divided into a plurality of cooperating sections or parts including an upper portion 15, a downwardly extending barrel 16, and a barrel extension or nose 17. Extension or nose 17 supports a working implement 18 which, in the present instance, is a tamping bar. Referring also to Fig. 5, the inner end of the bar 18 projects into the barrel 16 in position to receive blows of percussion from a hammer piston 19. The piston 19 forms part of a free piston type hammer assembly and moves within a cylindrical cage 20 slidably mounted within the barrel 16. The cage 20 is reciprocated by power transmission means connected to the driving piston 21 of the internal combustion engine. The transmission means, hereinafter more fully described, comprises an engine crankshaft 22 driven by the piston 21, a main crankshaft 23 actuated by the engine crankshaft 22 through pinion and gear means, and a connecting rod 24 between the main crankshaft 23 and the cage 20. The reciprocating action of cage 20 imparts repetitive hammering action to the hammer piston 19 as hereinafter described.

The bar 18, maintained in operative position within the barrel 16 and barrel nose 17, is pressed into engagement with the work by the operator during operation of the tool and is driven outwardly by repetitive blows of percussion delivered upon its inner end by the hammer piston 19. The adjacent ends of the barrel 16 and the barrel nose 17 are provided with flanges 25 and 26 respectively which are secured together by bolts 27. As best shown in Fig. 5, a locating sleeve 28 to maintain the tamping bar 18 in alignment with the barrel and nose is disposed within the outer end of the barrel nose 17 and is provided at its inner end with a flange 29 which seats upon an inwardly projecting shoulder 30 of the nose 17. Sleeve 28 is made in two pieces having complementary recesses forming a hexagonal opening for the bar 18. The sleeve is retained against axial movement by a spring 31 which is arranged within the nose in compression between the sleeve and a two-piece snubber ring 32. The latter ring abuts a retainer ring 33 which is seated in fixed position betwen the upper end of the nose 17 and the shoulder 34 adjacent the flange 25 on the lower end of the barrel 16. Abutting the inner end of the retainer ring 33 is another snubber ring 35 which is maintained in such abutting position by a spring 36 in compression between the ring 35 and an internal annular flange 37 upon the barrel 16. The resistance of the spring 36 is such as to maintain ring 35 in abutting relation to retainer ring 33 and thereby to maintain the tamping bar in predetermined position under the weight of the tool as positioned for normal operations. The lower snubber ring 32 is formed with an internal annular seat 38 and the upper snubber ring 35 is provided with an internal annular seat 39, said seats being arranged in opposition to form with the intervening retainer ring 33 a chamber 41 within which the collar 42 on the tamping bar 18 reciprocates. The tamping bar is driven downwardly or outwardly by the blow of the hammer piston 19, the collar 42 sometimes striking the seat 38 of the lower snubber ring 32 which yields with the preloaded compression spring 31. If the tamper bar 18 is held off the ground with the machine in operation the spring 31 reacts to force the bar upwardly after each blow driving it against the seat 39 of the upper snubber ring 35 where its force is absorbed by said ring as yieldingly reinforced by the preloaded compression spring 36. The upper snubber ring 35 is formed with an upwardly projecting cylindrical flange 43 which, in conjunction with the sleeve 16, maintains the tamping bar in axial alignment with the hammer piston 19.

The tamping bar is driven in its working operations by blows percussively imparted by the striking or hammer piston 19 which is slidingly mounted in cage 20. Cylindrical cage 20, which is made from a seamless steel tubing, is provided at its ends with annular enlargements or shoulders 44 and 45 which slidingly engage the inner wall of barrel 16. The mid-portion of the cage 20 is of reduced external diameter to provide an annular space 46 between the cage and the barrel, and said portion of reduced diameter is formed with a series of circumferentially spaced ports or openings 47 to cooperate with a groove 48 in the piston as hereinafter more fully described. The shoulders 44 and 45 are formed with circumferentially arranged longitudinal recesses 49 which serve to connect the annular space 46 respectively with the chamber 52 of the main crankshaft and the barrel chamber 53. Continuous communication is thus established between the top and bottom of the cage to minimize pressure fluctuations. The chambers 52 and 53 may be vented by exhaust ports (not shown) or alternatively may be enclosed from the atmosphere and maintained at any suitable pressure. In any event, the pressure fluctuations in chambers 52 and 53 are slight, due to the equalizing effect of recesses 49 which transfer air from one chamber to the other and thereby inhibit compression in either chamber as a result of the movements of cage 20 and piston 19. Cage 20 is connected to the connecting rod 24 by means of a wrist pin 55 which is passed through aligned holes in the upper end of the cage and in the lower terminal of the connecting rod. An aluminum head 56 fits snugly within the upper end of cage 20 to form an air-tight closure for a chamber or air pocket 57 which lies above hammer piston 19. The head is transversely bored to receive the wrist pin 55 and is provided at its upper end with a square recess to receive the lower end of the connecting rod. The cage head 56 has a downwardly protruding portion which fills up a considerable part of the air pocket 57. Reciprocating movement is imparted to the cage by the connecting rod 24, and is transmitted through the air pocket 57 to the striking piston 19, as will shortly appear.

The striking or hammer piston 19 has a sliding fit with the inner wall of the cage 20 and is formed with a lower face 58 which functions as a hammer surface to strike the upper face of the tamping bar 18. The piston is formed with a cup shaped recess 59 in its upper portion and with circumferential groove 48 approximately midway its length. Groove 48 is connected to recess 59 by radial ports 60, so that upon the registration of ports 47 with groove 48 the interior of the cage 20 is connected to atmosphere through recess 59, ports 60, groove 48, ports 47, space 46, recesses 49, chambers 52 and 53, and exhaust ports (not shown). Recess 59 is shaped to loosely receive the protruding portion of cage head 56, and forms a continuation of the pocket 57. Upon downward movement of the cage, air is compressed within such pocket forcing the piston 19 downwardly to strike the tamping bar 18. At this point the circumferential ports 47 in the cage are brought into registration with the groove 48 in the piston, and the compressed air in the pocket is set free. The cage thereupon moves upwardly drawing the ports 47 out of registration with the groove 48 and a partial vacuum or area of low pressure is created in the cage pocket 57. This will cause the piston to follow the cage upwardly until the ports and groove are again in registration. The momentum of the hammer piston 19 carries it upwardly for a short time after the cage has started downwardly, thereby forming a compressed air cushion which prevents the hammer piston from striking the cage. As the cage continues downwardly, the compressed air forces the piston downwardly to begin a new cycle.

Figure 16:
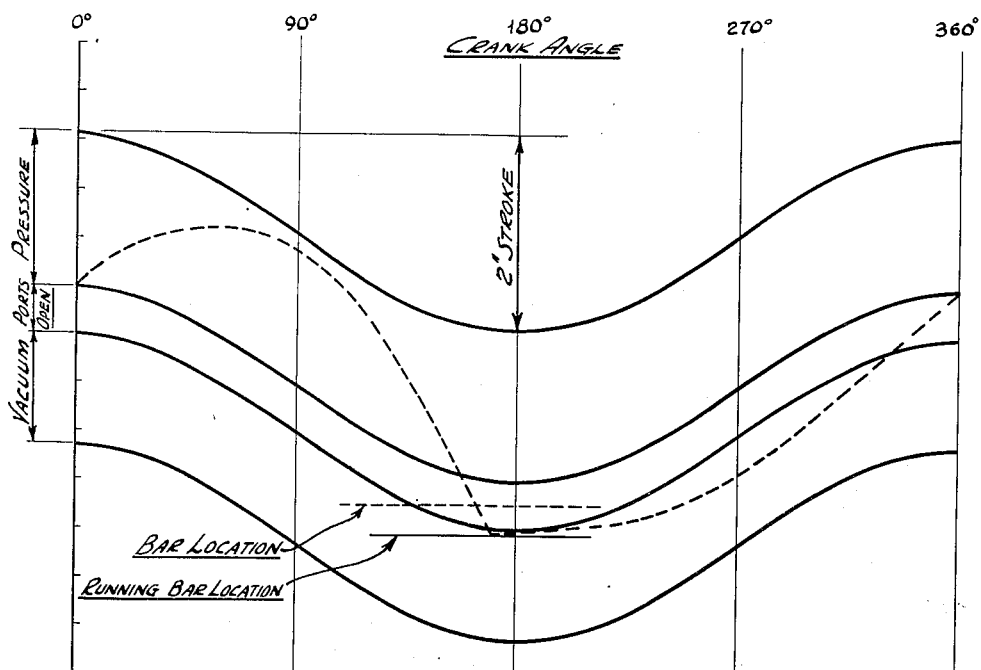
Fig. 16 is a Strobotac chart of the hammer position shown in relation to the vacuum, open port, and pressure regions of the striking cage at progressive angular positions of the crank.

Reference is made to the chart, shown as Fig. 16, for a graphic explanation of the movement of the cage 20 and hammer piston 19 in relation to the angle of the main crankshaft 23. In operation, the cage, whose position relative to the barrel 16 is depicted by four solid lines, reciprocates through a two inch stroke, being driven by the crankshaft at approximately 1400 revolutions (or reciprocations) per minute. The piston 19, represented by broken lines, operates inside the cage and its movement is affected by the cage only through the air pressure in the chamber or pocket 57 above the piston. When the machine is standing up resting on the bar 18 with the cage 20 at the bottom of its stroke and the piston 19 down on the bar, the port holes 47 in the cage register with the groove 48 in the piston. When the cage rises, the ports in the piston are closed and a partial vacuum is created in the closed chamber 57 between the piston and cage head. This creates a net upward force on the piston causing it to rise after the cage. This accelerating force continues to increase until the piston attains a higher velocity than that of the cage which occurs under normal operation somewhere around 280° but under starting conditions may occur later. Then the accelerating force begins to decrease although the upward velocity of the piston continues the increase until the piston and cage ports again line up and atmospheric pressure is restored to the air chamber 57 and 59. This occurs at about 330° under normal operation, and at top dead center the piston ports again close off as the piston rides into the pressure pocket or upper portion of the cage. The upward velocity of the piston is then reduced as its energy is absorbed by the air being compressed in the pressure pocket 57. At about 60° past T. D. C. the piston has lost its upward motion and starts downward. Since the cage is moving downward at a now increasing rate (due to the crank angle) the piston and cage continue to move relative to each other building up a still higher air pressure in the air pocket 57 as some of the kinetic energy of the rotating parts is converted and stored in the compressed air. At about 90° past T. D. C. the piston has attained the same velocity as the cage (maximum cage velocity occurring at this point), and the peak air pressure has been attained. From this point to 155° the piston 19 is accelerated above cage speed as the energy stored in the air is returned to the piston in the form of increased downward velocity. At this point, 155° past T. D. C., the ports are again opening and the piston has attained its maximum downward velocity. The piston then strikes the bar 18 at about 170° crank angle just as the vacuum pocket 57 is again about to close.

The exact point at which the bar 18 is struck depends upon the relative location of the bar to the rest of the machine. If no downward force is applied to the machine by the operator, the machine will tend to rise until the bar collar 42 is down close to the snubber ring 32 as illustrated diagrammatically in Fig. 16. The piston having struck the bar transfers a large portion of its energy to the bar and rebounds upward with a low velocity as shown on the chart. The upward velocity of the cage exceeds that of the piston at about 200° past T. D. C. and the piston rides into the vacuum pocket 57 and starts a new cycle. Any loss of air from the pressure pocket through leakage around the piston 19 is made up when the cage and piston ports line up again allowing atmospheric air to enter. This tends to maintain constant conditions from one cycle to the next and insures uniform operation.

The protruding portion of the aluminum cage head 56 is designed to fit down inside the hollow portion of the piston 19 when the piston is near the top of the pressure pocket. This is necessary so that the final volume of the air chamber at peak pressure will be small enough to prevent the piston from actually touching the cage head.

The removal of the bottom pressure pocket of the old design eliminated the possibility of the piston riding into this pocket at full striking velocity if snubber failure should allow the bar to drop below normal level. This happened quite frequently on the old machine when the rubber snubbers failed causing breakage of magneto parts, crankcase housings, crankshafts and other fairly rugged parts of the machine. In the new machine a vacuum pocket on top of the piston has replaced the lower pressure pocket and as a result if snubber failure should occur the piston will ride right through the vacuum pocket and thus it drops out of engagement with the cage ports and ceases to operate until the bar has been restored to its proper position. This happens when the piston port groove 48 drops below the bottom of the cage. It is impossible for the piston to come completely out of the cage.

The peak force that can be exerted on the piston or cage by the vacuum pocket 57 is not large, since little is required to raise the piston on the up stroke of the cage during normal operation. When the piston does drop out of the cage vacuum pocket it ceases to strike the bar 18 and the motor speeds up thus advising the operator that something is wrong and at the same time preventing further operation which might harm other parts of the machine.

The machine is further protected from shock loading by the two preloaded snubber springs 36 and 31 which limit the upward and downward motion of the bar by absorbing the energy from the bar in either direction at relatively low peak forces. Approximately 1/16" of bar shake is provided before the bar collar 42 contacts either spring. In normal tamping operations, with the operator applying a slight downward pressure on the machine, the bar collar is about 1/8" away from the ring 32 on the lower snubber spring 31, and since the bar travel per blow is much less than this, the bar collar does not contact either ring 32 or ring 35. However, when the machine is being lifted, the lower snubber spring 31 absorbs the full energy of downward motion of the bar and returns the bar upwards at a reduced velocity due to energy having been lost in friction chiefly between the bar and the two hexagonal bushings 43 and 23 which guide it. The function of the upper snubber spring 36 is to absorb the energy of the upward motion of the bar 18 and return it in a downward direction. The bar may oscillate back and forth several times before the energy is dissipated and the next blow is struck.

The upper portion 15 of the tool contains the internal combustion engine and controls therefor, including the starting mechanism and fly-wheel magneto. In the illustrative embodiment the engine is of the two-cycle type. The principal supporting element for the engine is a frame piece or crank case 61, to which is bolted a cover 61ª, the frame piece and cover being made of aluminum, and cooperating to form an air-tight crankcase chamber 62 through which the connecting rod 63 passes. The driving piston 21 reciprocates within a cylinder 64 in the cylinder head 65 secured to the frame in conventional manner. It will be seen that the piston 21 divides the interior of the cylinder 64 in such a way as to separate the upper chamber 66 from the lower chamber 62 which chambers may be respectively identified as the "combustion chamber" and the "pre-compression chamber." A mixture of gasoline and air is introduced into the combustion chamber 66 through a port 67 in the cylinder 64 while burned gases resulting from the explosion within the cylinder will escape through an exhaust port 68. The port 67 communicates with a transfer passage 69 formed in the cylinder head. The flow of gasoline and air into the precompression chamber 62 is controlled by a carburetor (Fig. 14) as hereinafter more fully described.

Transfer passage 69 communicates also with the precompression chamber 62 by a port 70 in the piston, whenever port 70 registers with a complementary cylinder port. The port 67 is controlled by the piston 21 and is open only in the lowermost operative position of the piston, as in Fig. 7. In the operation of the engine an explosive charge, previously introduced into the combustion chamber 66 is ignited by a spark plug 70ª mounted in the cylinder head 65 and extending into chamber 66. The piston 21 is thereby driven downward through its power stroke, and near the end of its downward movement uncovers exhaust port 68. Shortly after the opening of such port, the piston 21 uncovers port 67 and a pre-compressed mixture of gasoline and air flows into the combustion chamber 66. The mixture is directed upwards by a curved deflecting surface 74 on the head of the piston 21 and forces the burned gases downward and out of the exhaust port. Near the start of the upward or return stroke of the piston the port 67 and exhaust port 68 are closed. As the piston 21 continues its upward movement the precompression chamber 62 expands in size and draws a fresh mixture of air and gas from the carburetor. The fresh gases are prevented from entering the combustion chamber 66 at this time. While a new charge is thus drawn into the precompression chamber 62, the one previously admitted to the chamber 66 is compressed and as the piston reaches its uppermost position is ignited and explodes. The downward movement of the piston resulting from the explosion again reduces the size of the precompression chamber 62 and the gases within the chamber are first compressed and later transferred through the supply passages 69 to the upper chamber 66. The engine thus completes a cycle of operation in two strokes or one reciprocation of the piston; each descent of the piston being a power stroke occasioned by an explosion in the combustion chamber.

The carburetor (Figs. 13 and 14) is of standard type and comprises essentially an air filter 71, a gasoline filter 72 disposed within tank 72ª, a needle valve 73 to control the supply of gasoline fed into the desired mixture, a passageway 74 leading to the precompression chamber 62 and a reed valve 75 controlling passageway 74 and responsive to the variations in pressure in the precompression chamber. At a predetermined point in the upward movement of the piston, the pressure in the precompression chamber is reduced to a point that the reed valve will open and the mixture of air and gasoline will be drawn into the precompression chamber. As the piston reverses to move downwardly, the pressure built up in the precompression chamber will cause the reed valve to close preventing the return of the mixture, and the mixture confined in the precompression chamber will be forced through port 70 into transfer passage 69 as previously described.

Motion is transmitted from the piston 21 through the engine crankshaft 22 to the main shaft 23. The engine crankshaft 22 is rotatably supported in ball bearing assemblies 76 and 77, the latter being mounted in the frame 61. The left hand end of the engine crankshaft (as viewed in Fig. 7) extends into the crankcase chamber 62 and has keyed thereto, as at 78, a crank arm 79. Arm 79 has an outwardly projecting stud 81 extending into a cylindrical aperture 82 in the connecting rod 63 and is also formed with a fan-shaped counterweight 83. Needle bearings 80 are provided for the easy rotation of the stud 81 within the connecting rod receiving aperture 82.

For effecting return motion of the piston 21 and thereby of the piston hammer assembly, a fly-wheel 84 is mounted upon the outer end of the engine crankshaft. The kinetic energy stored in the fly-wheel 84 on the power stroke of the piston 21, in conjunction with the counterweight 83, is sufficient to continue the rotation of the crankshaft 22 and to transmit through the crank arm 79 and connecting rod 63 force for the return stroke of the piston 21. The connection between the rod 63 and the crankshaft 22 is such that they are constrained to move in unison, and operation of either element effects a simultaneous operation of the other. Their relationship as driven and driving elements is mutual and reversible.

Figure 15:
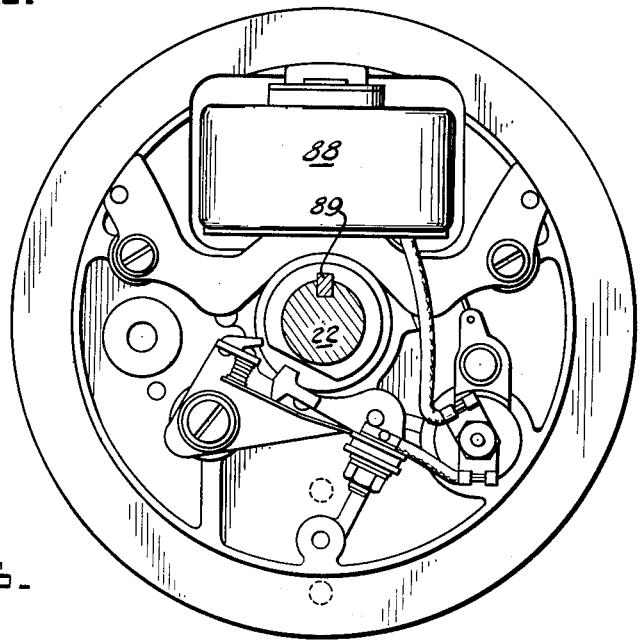
Fig. 15 is a detail view, in side elevation, of the stator plate and associated parts of the magneto, looking in the direction indicated by the arrows 15 in Fig. 7.

The ignition system of the tool includes a fly-wheel magneto mechanism for generating an electric current which is supplied through a cable 85 to the spark plug 70ª and is adapted to supply interrupted current under the control of suitable timing or circuit breaking mechanism. As best shown in Fig. 15, the fly-wheel magneto and circuit breaker are combined in a unitary structure which in itself is old and well-known. An embodiment thereof with some modifications not material to the invention is more fully described in Fitch Patent 2,333,419, supra. It need merely be said that in the present construction the permanent magnet 87 is secured to the fly-wheel 84 and acts as the rotor which sets up magnetic lines of force as it revolves around the stationary coil 88, thereby inducing current pulsations which are transmitted through conductor 85. The flywheel magnet mechanism is mounted upon the right hand end of the crankshaft 22, being keyed thereto at 89 and retained against longitudinal movement along the shaft by a suitable nut 90 and washer 91. The magneto housing 92, secured to the crank case or frame 61, serves as a support for the ball bearing 76 in which crankshaft 22 is mounted.

The engine crankshaft 22 drives the main crankshaft 23 by means of pinion 93 on the engine crankshaft and the gear wheel 94 which is integral with the main crankshaft. Main crankshaft 23 is rotatably mounted in the frame 61 by needle bearings 96 and ball thrust bearings 97, and is provided at its forward portion with splines which form a pinion 98 to cooperate with the toothed clutch ring 99, as hereinafter described. The inner face of gear wheel 94 is provided with a stud 101 which projects into the circular aperture 102 in the terminal portion 103 of the cage connecting rod 24, a bushing 104 being disposed between the stud and the rod terminal. Connecting rod 24 is connected at its lower end to the cage 20 by wrist pin 55, as hereinbefore described. It thus may be seen that the reciprocal motion of the engine or driving piston 21 is transmitted through the connecting rod 63 and the crankshaft arm 79 to impart rotary motion to the engine crankshaft 22 and that in operation the engine crankshaft 22 drives the main crankshaft 23. Crankshaft 23, through the cage connecting rod 24, acts as a reciprocating driver for the cage 20.

The toothed clutch ring 99 and rollers 106, as shown in Figs. 7 and 12, cooperate to form a clutch mechanism between the starter shaft 107 and the main crankshaft 23. Ring 99 is formed with an axial bore 108 and with a toothed periphery 109 to gear with the splined portion of the main crankshaft 23. The inner wall of the ring 99 is provided with an annular recess 111 (Fig. 7) to seat a flanged bearing ring 112, the body of which is brazed to the clutch ring 99 and the flange 113 of which forms a bearing for the ring assembly upon the starter shaft 107. The bearing ring 112 is used only to simplify machining operations in the manufacture of the clutch ring; otherwise said clutch ring and flanged ring can be made unitary. Flange 113 is seated in a felt washer 115. The axial bore 108 of the clutch ring 99 is provided with a plurality of spaced slots 116 (Fig. 12) circumferentially arranged and extending axially from the body of the brazed ring to the outer wall of the clutch ring. Each slot is formed with an adjacent arcuate portion 117 the purpose of which will be explained.

As best shown in Fig. 7, the starter shaft 107 is mounted in the frame 61, its end portions being supported by needle bearings 118 and 119 which are carried respectively by the frame 61 and the starter cover 121. The shaft is formed with a central portion 122 of larger diameter, the outer radial face of which serves as a locating shoulder 123. A washer 124 is disposed between the shoulder 123 and the starter cover 121. The flange 113 of the flanged ring 112 abuts against the outer radial wall of the terminal 125 of the starter handle 13, the inner wall 126 of said handle abutting against the frame 61. In this manner the frame maintains the starter shaft 107 against axial movement inwardly and the starter cover 121 maintains it against axial movement outwardly.

The periphery of the central portion 122 of the starter shaft 107 is formed with a plurality of longitudinally extending spaced grooves 129 which serve, in conjunction with the cooperating slots 116 in the bore of the clutch ring 99, as seats for rollers 106 to form a clutch as previously stated. Each peripheral groove has an arcuate portion 130 throughout its length which has the same radius as a roller and forms a shoulder adapted to engage a roller to force it against the arcuate portion 117 of the slot 116 when shaft 107 is rotated counterclockwise (as viewed in Fig. 12) by the rotary thrust of the starter handle 13. One of the rollers 106, which will be at rest upon the upper portion of the starter shaft when the tool is not in operation, will wedge between a shoulder 130 of the starter shaft 107 and an arcuate portion 117 of a slot 116 when the shaft is actuated. In Fig. 12 such engagement is shown in the "10 o'clock position," although in actual operations such engagement or clutching may take place at any point in the upper portion of the shaft. Clutching will not be effected in the lower regions since the rollers will drop by gravity into the slots 116 when the tool is at rest. Motion is imparted to the starter shaft by a sudden downward thrust by the operator of the starter arm 13 whose inner terminal 125 is provided with teeth 132 to engage splines 133 formed on the forward portion of the starter shaft 107. Such starting motion of the starter shaft is counterclockwise and the clutch ring 99 moves in the same direction at the speed of the starter shaft. Said clutch ring transmits motion at a higher speed to the main crankshaft, thence at a still higher speed to the engine or magneto crankshaft 22. As the engine picks up speed, the clutch ring will overrun the starter shaft and the rollers will be urged by centrifugal force into the slots 116 where they will remain throughout the normal operation of the tool.

In the illustrative embodiment the total gear ratio from the starter shaft 107 to the engine crankshaft 22 is 11.4 to 1. Thus a quarter turn of the starter shaft will turn the engine over approximately three times. A rapid downward thrust of the starter handle 13 through its normal ten inch stroke (approximately one-quarter turn of starter shaft) will produce more than three full revolutions of the engine at a fairly high speed.

The gear ratio between the engine crankshaft 22 and the main crankshaft 23 is about 2.85 to 1. The advantages of using a high speed motor with gear reduction are more power per cubic inch of motor, more cooling air with a smaller fan, better magneto operation (hotter spark) and smoother operation due to larger number of smaller motor impulses and accentuated fly-wheel effect of the rather heavy magneto rotor.

When the tool is not in operation (Figs. 2 and 3) the starter handle 13 is maintained in locked position against one side of the tool by the latching mechanism 134, best shown in Figs. 8, 9, 10 and 11. When the tool is in operation, the starter handle is clear of the latching mechanism, as in Fig. 1. Latching mechanism 134 comprises a stud 135 screwed into the frame 61, a latch 136 which is pivotally mounted on the outer end of the stud and is provided with a handle 137, a helical spring 138 mounted upon the stud to urge the latch outward, a nut 139 preventing outward movement of the latch, and a cotter pin 140 to secure the nut on the stud 135. The spring is formed with an extending terminal 141 which is in pressing engagement with the frame 61 at 142 (Figs. 1 and 2) and with an extending terminal 143 (Figs. 8 and 9) at its other end which engages projecting arm 144 of the latch. In the normal position of the latch the spring urges the latch in a counterclockwise direction so that the arm 144 (Fig. 9) rests in a depression 145 (Fig. 9) in the housing, the handle of the latch pointing downwardly and to the left as shown in Figs. 1 and 3. When the operator shuts off the motor and desires to lay the tool aside, as is frequently required under working conditions on the railroad tracks, he slams the starter handle upwardly and inwardly. The cross bar 146, in the area indicated at 147, then strikes the outer end 148 of the latch handle 137 camming it upwardly and clockwise against the resistance of the helical torsion spring 138. As the upward and clockwise motion of the cross bar continues, the bar in the area indicated at 149 (Fig. 8) strikes the projection 151 of the latch causing a further camming action upwardly until the cross bar finally clears the latch which then is sprung downwardly in a counterclockwise direction until its movement is arrested by the projecting arm 144 falling into the depression 145 of the housing. The handle is thus quickly locked into a position which is inoperative for starting purposes but operative in the sense of enabling the manipulation of the machine during tamping operations. It is not necessary for the operator to transfer his grip from the starting handle after starting the machine since this handle is also used for manipulating the unit. To unlock the latch, it is merely necessary for the operator by manipulative pressure to lift the latch in a clockwise direction, slightly beyond the horizontal position shown in Fig. 8 and move the starter handle 13 outwardly in a clockwise direction to the position shown in Fig. 1. He then by a quick thrust of the starter handle can start the motor. A locating pin 152 projecting from the frame 61 cooperates with a recess 153 in the cross bar of the starter handle to maintain the handle in rigid position when locked, so as to minimize damage from accidental blows to which the tool is subjected under ordinary working conditions.

The air cooling system (Figs. 4 and 7) has been provided for the tool and serves not only to cool the engine but to keep other parts of the tool at a temperature that is comfortable for the operator. The rear face of the fly-wheel 84 is provided with a circumferential row of fan blades 154 which drive a steady current of air as indicated by the arrows upwardly and into the space beneath and within the aluminum hood 156. Air is supplied through the screened passage 155. The hood, which is secured to the frame 61, extends completely over the engine and is formed with a downwardly turned skirt 157 which extends below the exhaust manifold 158. This extension of the hood below the exhaust port forms an important feature of the invention. The exhaust gas is driven from the piston chamber 66 at high speed tending to create a low pressure area in the confined space within the adjacent hood and thereby implements the fans in the circulation of the air cooling supply. To facilitate such circulation the exhaust deflector 159 is shaped with a tapered throat as in the case of a jet pump.

The exhaust deflector 159 may be removed whenever it is desired to scrape carbon from the exhaust port 68. To this end the deflector is attached to the cylinder head 65 by means of screws 160 which are readily accessible through holes 161 in the hood 156.

The illustrative machine will operate for over three hours without refilling the gas tank, and no lubrication, other than oil mixed with the gasoline is required. The entire machine is lubricated by the oil mixed with the gasoline in the ratio of about 16 to 1. A portion of this oil is diverted from the engine crankcase 62 and sprayed into the main crankcase 52 in a fine mist where it thoroughly lubricates all parts and gradually drains down through the machine running out along the bar 18. This continual oil flow has a purging effect as it tends to wash out any dirt that may get into the machine. The starter parts are also well lubricated by oil seeping into the starter compartment of the housing through the needle bearing 96 which supports the main crankshaft between the two compartments.

The leakage of oil from the engine crankcase through the shielded ball bearing 77 to the main crankcase occurs during each precompression stroke of the engine when the pressure in the engine crankcase exceeds that in the main crankcase 52. Lubrication of the engine parts is not impaired and the quantity of oil lost as smoke through the engine exhaust 158 is reduced.

Divisional applications on matter disclosed herein have been filed as follows: Serial No. 103,662, filed July 8, 1949, containing claims to an impact mechanism; Serial No. 175,742, filed July 25, 1950, containing claims to a combined engine, tool, and starter; Serial No. 176,984, filed August 1, 1950, containing claims to a cooling system for an internal combustion engine.

What is claimed is:

1. In a percussive tool of the type which is powered by an internal combustion engine having a manually operable starter mechanism, a combination comprising a manipulative member, an over-running clutch, gear means connected with the transmission system of the engine, said clutch connected to the gear means for operation in one direction of rotation, one end of the manipulative member connected to the clutch and adapted upon movement in a first direction to impart rotary motion to the clutch to actuate the gear means, and a locking means arranged to engage said manipulative member when the latter is moved a given distance in a direction other than said first direction to lock said manipulative member into position for use as an operative handle.

2. In a percussive tool, a manipulative handle member adapted on movement in one direction to impart rotary motion to starter mechanism and on movement in the other direction to be locked into operative position against the tool by a latching mechanism, said latching mechanism comprising a stud threadably mounted in the tool, a latch handle associated therewith, a spiral spring surrounding the stud and having one terminal disposed against the housing to act as a fulcrum and the other terminal arranged to urge the latch handle in a predetermined direction, means for maintaining the latch handle in a predetermined position against the urging of the spring, and means upon the manipulative member to cam the latch handle into position to permit the passing of the manipulative handle upon the movement thereof into operative position, the spiral spring means being adapted to urge the latch handle into locking position upon the passing of the manipulative handle.

3. In a percussive tool, a combination as in claim 2, wherein the spring is of predetermined resistance whereby the latch handle may be moved into unlocking position by manual pressure.

4. A percussive tool comprising a housing, an internal combustion engine mounted therein, starting means for the engine comprising a first handle member, a clutch, and gear means, said first handle member disposed on a side of the housing and being connected at a lower end to the clutch and arranged to provide rotary movement to the clutch when swung in a downward direction, the clutch being arranged to transfer rotary motion in one direction to the gear means which is coupled to the transmission system of the engine, a second handle member affixed to the housing, and latching means to retain said first handle member in fixed position whereby said handle members jointly afford convenient grasping means for the operation of the tool.

5. In a percussive tool, a manipulative handle, and a latching mechanism adapted to lock said handle in fixed position, said latching mechanism comprising a stud member projecting from the body of the tool, a latch member pivotally mounted on the outer portion of the stud and provided with a handle, a helical spring surrounding the stud and arranged to urge the latch member in a direction away from the body of said tool, retaining means located on the ends of the stud to retain the latch member on said stud, said spring being further arranged to urge the latch member pivotally about said stud, and means projecting from the latch member arranged to abut a depression in the body of the tool to limit the pivotal motion of the latch member.

SPENCER B. MAURER.
HOWARD P. EBERT.

REFERENCES CITED

The following references are of record in the file of this patent:

UNITED STATES PATENTS

| Number | Name | Date |
|---|---|---|
| 1,035,182 | Gray | Aug. 13, 1912 |
| 1,159,462 | Baldwin | Nov. 9, 1915 |
| 1,160,474 | Webber et al. | Nov. 16, 1915 |
| 1,217,762 | Herzmark | Feb. 27, 1917 |
| 1,219,759 | Miller | Mar. 20, 1917 |
| 1,516,637 | Hoover | Nov. 25, 1924 |
| 2,268,954 | Marais | Jan. 6, 1942 |
| 2,273,095 | Fitch | Feb. 17, 1942 |
| 2,275,285 | Charles | Mar. 3, 1942 |